US 6,604,101 B1

(12) United States Patent
Chan et al.

(10) Patent No.: US 6,604,101 B1
(45) Date of Patent: Aug. 5, 2003

(54) METHOD AND SYSTEM FOR TRANSLINGUAL TRANSLATION OF QUERY AND SEARCH AND RETRIEVAL OF MULTILINGUAL INFORMATION ON A COMPUTER NETWORK

(75) Inventors: Ning-Ping Chan, El Cerrito, CA (US); Xiong Zhenghui, Baixiang (CN); Liu Zhuo, Shekeyuan Sushe (CN); Xiwen Ma, Redwood City, CA (US)

(73) Assignee: qNaturally Systems, Inc., El Cerritos, CA (US)

( * ) Notice: Subject to any disclaimer, the term of this patent is extended or adjusted under 35 U.S.C. 154(b) by 201 days.

(21) Appl. No.: 09/606,655

(22) Filed: Jun. 28, 2000

(51) Int. Cl.[7] ............................................. G06F 17/30
(52) U.S. Cl. ............................................. 707/4; 704/2
(58) Field of Search .................. 707/4, 10, 5; 709/231; 704/8, 2; 711/118

(56) References Cited

U.S. PATENT DOCUMENTS

| | | | | |
|---|---|---|---|---|
| 5,384,701 A | | 1/1995 | Stentiford et al. ..... 364/419.03 |
| 5,477,450 A | | 12/1995 | Takeda et al. ......... 364/419.02 |
| 5,677,835 A | | 10/1997 | Carbonell et al. ..... 364/419.02 |
| 5,694,559 A | | 12/1997 | Hobson et al. ............. 395/336 |
| 5,873,056 A | | 2/1999 | Liddy et al. .................... 704/9 |
| 5,893,133 A | | 4/1999 | Chen .......................... 707/535 |
| 5,956,740 A | * | 9/1999 | Nosohara .................... 715/536 |
| 5,963,940 A | | 10/1999 | Liddy et al. .................... 707/5 |
| 5,987,402 A | | 11/1999 | Murata et al. ................. 704/2 |
| 5,995,934 A | | 11/1999 | Tang .......................... 704/270 |
| 5,999,951 A | * | 12/1999 | Shibuya ...................... 715/536 |
| 6,002,997 A | | 12/1999 | Tou ............................... 704/2 |
| 6,006,221 A | * | 12/1999 | Liddy et al. .................... 707/5 |
| 6,024,571 A | * | 2/2000 | Renegar ...................... 434/157 |
| 6,055,528 A | | 4/2000 | Evans ............................ 707/3 |
| 6,064,951 A | * | 5/2000 | Park et al. ...................... 704/8 |
| 6,073,143 A | * | 6/2000 | Nishikawa et al. .......... 715/513 |
| 6,081,774 A | | 6/2000 | de Hita et al. .................. 704/9 |
| 6,092,035 A | | 7/2000 | Kurachi et al. ................ 704/3 |
| 6,119,078 A | | 9/2000 | Kobayakawa et al. ......... 704/3 |
| 6,138,112 A | | 10/2000 | Slutz ............................. 707/2 |
| 6,139,201 A | * | 10/2000 | Carbonell et al. ............. 704/2 |
| 6,161,082 A | | 12/2000 | Goldberg et al. .............. 704/3 |
| 6,173,279 B1 | * | 1/2001 | Levin et al. .................... 707/5 |
| 6,347,316 B1 | * | 2/2002 | Redpath ....................... 707/10 |

\* cited by examiner

Primary Examiner—Safet Metjahic
Assistant Examiner—Sana Al-Hashemi
(74) Attorney, Agent, or Firm—Oppenheimer Wolff & Donnelly LLP

(57) ABSTRACT

A method for translating a query input by the user in the source language into the target language and searching and retrieving web documents in the target language and translating the web documents into the source language. In this invention, the user first inputs a query in a source language through a unit such as the keyboard. This query is then processed by the server at the backend to extract content word from the input query. The next step takes place at the dialectal controller, which is present on the server and performs the function of dialectally standardizing the content word/words so extracted. During this process the user may be prompted for some more so as to refine the search by the user or in case dialectal standardization could not be performed using the initial input query. This is followed by the process of pre-search translation, which comprises of translating the dialectally standardized word into a target language through a translator. This process of translation is followed by inputting the translated word into a search engine in the target language. Such an input yields search results in the target language corresponding to the translated word. The results so obtained are then displayed in the form of site names (URL) which satisfy the search criteria. All the results thus obtained in the target language are then displayed on the user screen. According to the user's needs such results may then be translated back either in whole or in part into the source language.

28 Claims, 3 Drawing Sheets

METHOD AND SYSTEM FOR TRANSLINGUAL TRANSLATION OF QUERY AND SEARCH AND RETRIEVAL OF MULTILINGUAL INFORMATION ON A COMPUTER NETWORK

BACKGROUND OF THE INVENTION

1. Field of the Invention

This invention relates generally to translation of query and retrieval of multilingual information on the web and more particularly to a method and system for conducting a translingual search on the Internet and accessing multilingual web sites through dialectal standardization, pre-search translation and post-search translation.

2. Description of Prior Art

The World Wide Web is a fast expanding terrain of information available via the Internet. The sheer volume of documents available on different sites on the World Wide Web ("Web") warrants that there be efficient search tools for quick search and retrieval of relevant information. In this context, search engines assume great significance because of their utility as search tools that help the users to search and retrieve specific information from the Web by using keywords, phrases or queries.

A whole array of search tools is available these days for users to choose from in conducting their search. However, search tools are not all the same. They differ from one another primarily in the manner they index information or web sites in their respective databases using a particular algorithm peculiar to that search tool. It is important to know the difference between the various search tools because while each search tool does perform the common task of searching and retrieving information, each one accomplishes the task differently. Hence, the difference in search results from different search engines even though the same phrases/queries are inputted.

Search tools of different kinds fall broadly into five categories, which are as follows:

1. directories;
2. search engines;
3. super engines;
4. meta search engines; and
5. special search engines.

Search tools like Yahoo, Magellan and Look Smart qualify as web directories. Each of these web directories has developed its own database comprising of selected web sites. Thus, when a user uses a directory like Yahoo to perform a search, he/she is searching the database maintained by Yahoo and browsing its contents.

Search engines like Infoseek, Webcrawler and Lycos use software such as "spiders" and "robots" that crawl around the Web and index, and catalogue the contents from different web sites into the database of the search engine itself.

A more sophisticated class of search engines includes super engines, which use a similar kind of software as "robots" and "spiders." However, they are different from ordinary search engines because they index keywords appearing not only on the title but anywhere in the text of a site content. Hot Bot and Altavista are examples of super engines.

Search engines further include meta search engines, which consist of several search engines. A user using a meta search engine actually browses through a whole set of search engines contained in the database of the meta search engine. Dogpile and Savvy Search are examples of meta search engines.

Special search engines are another type of search engines that cater to the needs of users seeking information on particular subject areas. Deja News and Infospace are examples of special search engines.

Thus, each one of these search tools is unique in terms of the way it performs a search and works towards fulfilling the common goal of making resources on the web available to users.

However, most of these search engines are limited in their scope in so far as most of these search engines cater to the needs of the English speaking community alone and help in the search and retrieval of monolingual documents only. Most of these search engines require input in English and search web sites that have information available in English only. In other words, most of the search tools cater primarily to the needs of the English speaking Internet user. This attribute renders these search tools almost useless to the non-English speaking Internet users who constitute as much as 75% of the Internet user population. This non-English speaking user community is unable to search English web sites since it cannot adequately input phrases or queries in English. Consequently, this community of users is unable to benefit from the search tools and web documents available in English. This is a serious drawback, which has not been addressed by any of the existing search engines.

Likewise, the non-English speaking Internet users also create web sites to store information in non-English languages. This rich source of information is not available to query by English oriented search engines. As a result the English speaking population remains deprived of the resources available in the other languages of the world for the same reasons as discussed above.

As an example, when preparing a Chinese To-fu dish which calls for "shrimp caviare," a search was made on a super engine, such as Altavista.com to check the availability of "shrimp caviare" anywhere in the world. A search using Altavista.com under "all language" revealed no matching results under either "English" or "Chinese" setting. A search was then made for the English term "shrimp caviare" at China.com, which is a Chinese search engine, but to no avail. Subsequently, the term "shrimp caviare" was looked up in Chinese to find its Chinese equivalent. The Chinese equivalent thus found was "xiazi" (meaning, "shrimp roe"). This word was then used for making the search on China.com and yielded as many as twenty-four hits.

Thus, a need exists for a translingual search engine with a built-in translator. Such a system should be capable of standardizing the query or phrase input by the user to a commonly known word and then translating the same into a target language prior to a search for sites that satisfies the search criteria. Such a system should be capable of inputting the translated keyword into a search engine of the target language to yield search results. Further, for convenience of the user, the system should be capable of translating the search results obtained in the target language back into the source language.

Such a system will help the users to transcend language barriers while making a search on the web. Such a system also obviates the need to manually and unsystematically find out the translated equivalent of a word in another language prior to conducting a search in that language.

Such a system will go a long way in transcending all language barriers and improving inter-human communication. This will not only pave the way for a healthier interactive environment and cultural exchange but also help in an optimal utilization of available resources on the Web.

There are some web sites, which offer translation services, but such sites merely create an illusion of multilingual search and information retrieval. What these sites offer in effect are machine translation services. Machine translation services are services that provide a literal translation of the words queried by users. Such translations are often found to be unintelligible and incomprehensible and as a result fall short of fulfilling any meaningful objective of users.

Systems have also been developed which attempt to transform a query input by the user in the native language also referred to as source language into a resulting language also referred to as a target language and provide as many translations as possible in the target language. The idea is to have such a transformed query ready for use in any of the available information retrieval systems.

However, this system is similar to the other search tools discussed earlier that fail to placate the long standing need for a one stop shop for users to dialectally standardize a user query to a more commonly known word and then translate this standardized word intelligently to the target language prior to search. Such a tool being also capable of conducting a search in the target language through the input of the translated keyword into a search engine of the target language and producing search results, and even generating translations of the search results in the source language.

SUMMARY OF THE INVENTION

One object of the present invention is to provide a method and a system that dialectally standardizes the keyword or query input by the user to a more commonly known and/or used term. Dialectal standardization is distinctly helpful because standardizing the word to a commonly known word insures that the search engine of the target language will recognize it.

Another object of the present invention is to provide a method and system that translates intelligently the standardized keyword or query input by the user in a source language into the target language.

Yet another object of the invention is to provide an option to the users to have the search results retrieved in the target language to be translated back into the source language.

A method for dialectally standardizing a query input by the user in the source language and then translating the standardized keyword to the target language and searching and retrieving web documents in the target language as well as providing translations of said search results into the source language.

In this method, the user first inputs a query in the source language through a unit such as the keyboard. This query is then processed by the server at the backend to extract content word from the input query. The next step takes place at the dialectal controller, which performs the function of dialectally standardizing the content word/words extracted from the input query. This insures that the keyword is standardized to a commonly known word/term. At this stage, the user may be prompted for some more input so as to refine the search or to perform dialectal standardization where the initial input phrase by the user was insufficient to perform Dialectal Standardization.

Thereafter, the dialectally standardized word is inputted into a translator to translate the dialectally standardized word into the target language. This process of translation that takes place prior to a search is known as pre-search engine translation. Following translation, the translated word is input into a search engine in the target language. Such an input yields search results in the target language that satisfy the search criteria. The results so obtained are then displayed in the form of site names (URL) on the user's screen.

Once the search results are made available to the user, the user has a set of available options. The user may either browse the search results in the target language or request that the search results obtained in the target language be translated into the source language. The user may further specify whether the entire search results or just portions of it need to be translated. This can be done by merely highlighting the portions of the search results desired to be translated and then entering the appropriate command.

The user may also specify as to what kind of a translation is required by the user depending on his/her needs i.e whether a simple machine translation with reading aids will be sufficient or a more intelligible translation of the search results and the contents of those web sites is desired.

An alternative embodiment of the present invention may also be used with a query prompter on the server so that in cases where the initial query entered by the user is insufficient for dialectal standardization, more input is solicited by the query prompter from the user to help standardize the words into acceptable and known words in the target language.

One advantage of the present invention is to provide a method and a system that dialectally standardizes the keyword or query input by the user to a more commonly known and/or used term. Dialectal standardization is distinctly helpful because standardizing the word to a commonly known word insures that the target language search engine will recognize it.

Another advantage of the present invention is to provide a method and system that translates intelligently the standardized keyword or query input by the user in a source language into a target language.

Yet another advantage of the invention is that it provides an option to the users to have the search results retrieved in the target language to be translated back into the source language.

The foregoing and other objects, features and advantages of the invention will be apparent from the following detailed description of the preferred embodiment, which makes reference to the drawings.

DETAILED DESCRIPTION OF THE INVENTION

The invention incorporates a new and unique methodology and system for translingual translation of query and search and retrieval of multilingual web documents. Such a system enables a user to access web documents in a target language other than his/her own source language with the option of having these web documents translated back either in part or in whole into the source language.

Broadly speaking, the process and system embodied by the invention take place in three stages: dialectal standardization, pre-search engine translation and post search engine translation.

Figure 1:
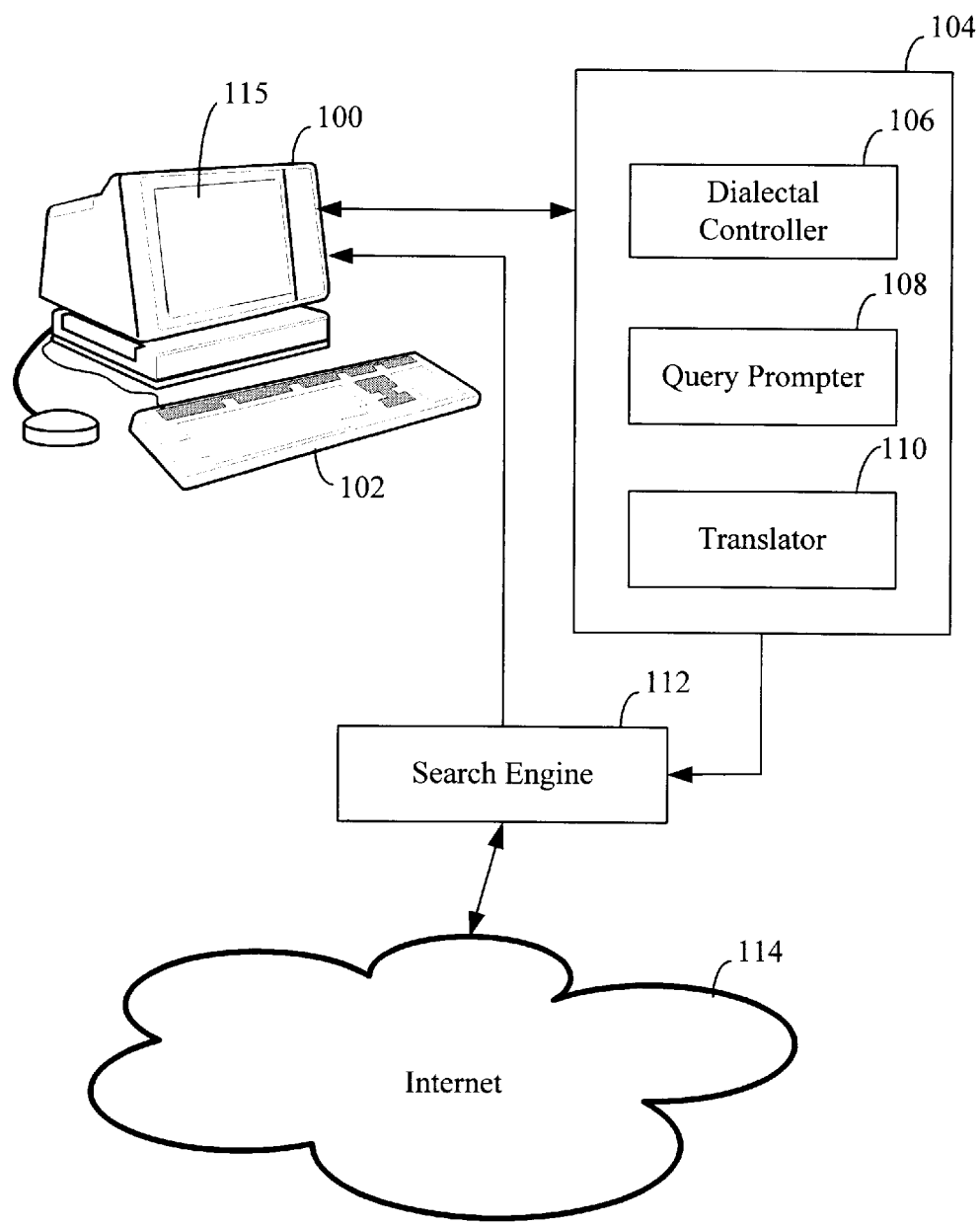
FIG. 1 is a schematic representation of one embodiment of the general overview of the system for translingual translation of query and search and retrieval of multilingual web documents.

FIG. 1 is a schematic representation of one embodiment of the general overview of the system for translingual translation of query and search and retrieval of multilingual web documents.

As illustrated in FIG. 1, a query input unit 100 is present on the computer used by a user. The query input unit has a query input device 102 such as a keyboard. The query input unit is connected to a server 104 which has at least three units, namely, a dialectal controller 106, a query prompter 108 and a translator 110. The server 104 is connected to a search engine 112, which in turn is connected to the Internet 114.

Figure 2:
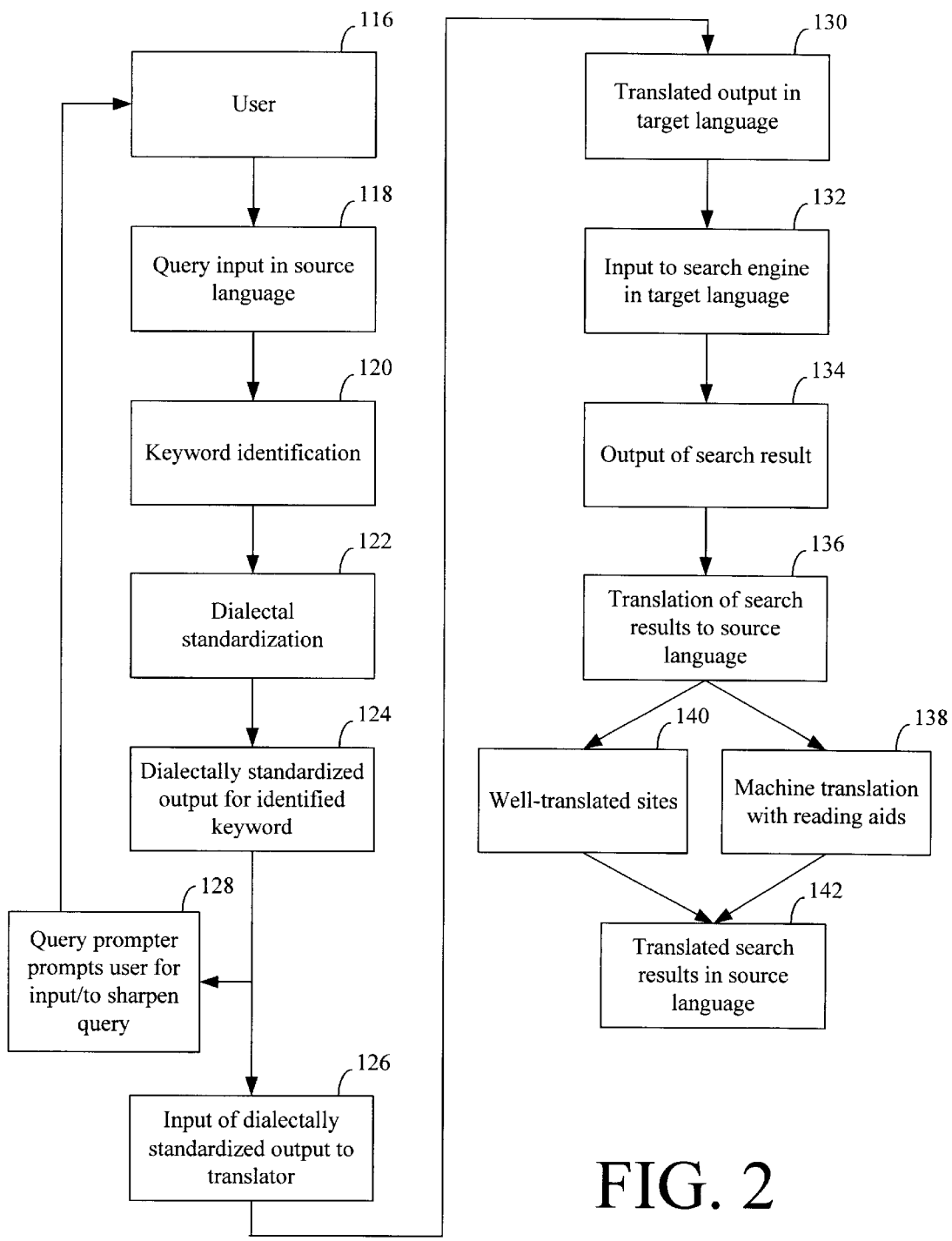
FIG. 2 is a schematic diagram of the different steps involved in the process of translingual translation of query and search and retrieval of multilingual web documents.

FIG. 2 is a schematic diagram of the different steps involved in the process of translingual translation of query and search and retrieval of multilingual web documents. The different steps take place in the three stages of dialectal standardization, pre-search translation and post-search translation.

DIALECTAL STANDARDIZATION

According to a preferred embodiment of the present invention, as illustrated in FIG. 2, a user 116 inputs a query in the source language 118 through an input device such as a keyboard. The query is received by a dialectal controller which processes the query and identifies a keyword from the query input 120. The dialectal controller extracts content word out of the query. The next step involves dialectal standardization 122, wherein the dialectal controller at server backend picks up the keyword and standardizes it to a commonly known word and/or term. This is done to bring about a consistency in the meaning of a word notwithstanding dialectal variations.

Dialectal standardization is an important step because often times words encountered have several different dialectal variations. A language such as English itself is full of dialectal variations in the form of British English and American English to name a few. Good examples of dialectal variations in these two dialects of English include centre vs. center, lorry vs. truck, queue vs. line and petrol vs. gasoline etc. Similar instances could be cited in many of the other languages of the world, too. In Chinese, for instance there are as many as 41 different dialectal variations for just one particular word. Such instances corroborate the fact that dialectal variations are the rule rather than the exception and therefore the only way to counter them is by standardizing a query or a word to a commonly known word.

In particular, the importance of dialectal standardization cannot be undermined in the present invention where the identified keyword needs to be given one consistent meaning. Otherwise, a single inconsistency could result in a wrong translation and ruin the entire search process during subsequent stages of search and information retrieval.

In a preferred embodiment of the present invention, if the dialectal controller fails to recognize the word and thus is unable to perform dialectal standardization, the query prompter unit may prompt the user for more input or request the user to choose from a set of expressions to assist, to clarify and to sharpen his/her query 128. In that case the user may submit another query to the query input device. Such a query may either be a standard term or a non-standard term. For instance, different variants of the word "auto" including automobile and transportation vehicle are permitted to be input by the user as part of the dialectal standardization process.

PRE-SEARCH TRANSLATION

According to a preferred embodiment of the present invention, the dialectally standardized output for the identified keyword is input 126 into the translator. The translator translates the standardized keyword into an equivalent in a target language and gives an output in the target language 130, such target language having been pre-selected by the user prior to the translation stage. In one embodiment, a pre-determined target language can be selected as a default target language. The output so obtained in the target language is then fed into a search engine of the target language 132. This input sets the search engine into motion and the search engine begins searching for sites related to that particular keyword and provides an output of search results 134. The search results obtained following the search are displayed as search results on the screen 115 of the user. The search results obtained may be of many different kinds such as titles/catalogs along with their URL links or actual web sites or web pages with contents or even subpages with title along with their URL links. The search results obtained may be any or all of these.

POST- SEARCH TRANSLATION

According to the preferred embodiment of this invention, the user now has access to the search results in the target language.

Depending on the user's competence level and needs, the user may either choose to view the search results so obtained in the target language itself, or he/she may specify that the search results be translated in whole or in part into the source language.

This can be done by the user by selectively highlighting the portions that he/she desires to be translated and by entering an appropriate command or selecting an appropriate option. In accordance with a preferred embodiment of the present invention, if the user chooses to have a post-search translation 136 of the search results from target language to source language, the user has two available options.

The user can choose between having a machine translation 138 of the web sites into the source language, such translation being available with reading aids. Alternatively, the user may choose a well translated version 140 of the site into the source language. The selection of a particular kind of translation by the user depends on his/her particular needs.

For instance, users who are totally unfamiliar with the sites in the target language may opt for machine translations with reading aids so as to get an idea about the contents of the site in a broad manner. On the other hand, users whose needs warrant a more clear and unambiguous translation of the sites will prefer well-translated sites.

After the user makes the selection of the kind of translation required by him/her, the search results are translated to the source language and the translated results 142 are displayed as search results on the screen of the user. The search results obtained may be of many different kinds such as titles/catalogs along with their URL links or actual web sites or web pages with contents or even sub pages with title along with their URL links. The search results obtained may be any or all of these and the user may opt to have any or all of these search results translated.

According to one embodiment of the present invention, the user may choose to have any or all of these different kinds of search results translated into the source language if he/she so desires.

Figure 3:
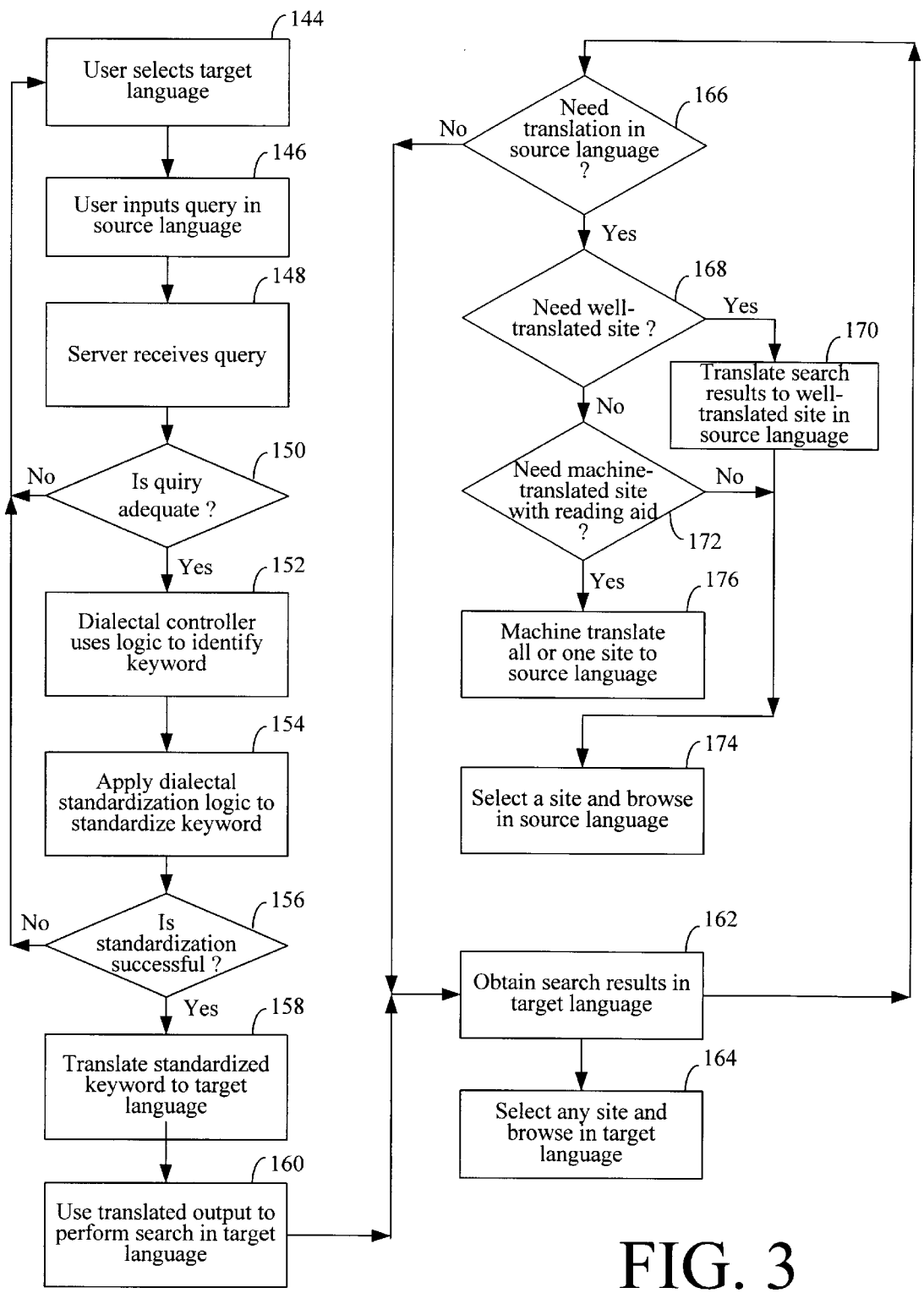
FIG. 3 is a flow diagram illustrating the processing of query input by a user in the source language, dialectal standardization of the input query, translation of the standardized word/keyword into a target language and obtaining search results in the target language and translation of search results into the source language.

FIG. 3 is a flow diagram illustrating the processing of the query submitted in the source language, dialectal standardization of the keyword, translation of the standardized keyword into the target language, search and retrieval of information and post-search translation. The process begins with the selection of a target language by the user 144. This is followed by an input of a query in a source language 146 by the user. The query so input is received by the server 148. If the server finds the query acceptable 150, the query is sent to the dialectal controller for processing. The dialectal controller uses processing logic to identify the keyword 152. Statistical data in conjunction with syntactic analysis provides the foundation for the processing logic so as to include and exclude certain kind of verbal entries. Thereafter, the dialectal controller applies dialectal standardization logic to standardize keyword 154. Such a logic is used so as to standardize the keyword to a commonly known word/term. If the standardization 156 is successful, the standardized word is input into a translator for translation of the standardized keyword into the target language 158. This step is followed by the input of this translated keyword into the search engine of the target language to perform search in the target language 160. This search yields results in target language 162 satisfying the search criteria. Depending on the user's competency level and needs, the user may choose to access the displayed search results in the target language itself 164 or alternatively, the user may have the results of the search translated in whole or in part into the source language 166.

In the event that the user chooses to have a post search translation, the user is provided with two options. The user can choose from either a machine translation of the web sites into the source language or a well translated version of the sites in the source language.

If the user opts for a well translated site 168, the well-translated version of the search results will be obtained from the collection of well-translated sites indexed in the database of the search engine 170. The database has a huge selection of well-translated sites, which are constantly updated so that users may have access to newer web documents. The user may then select a site and browse it in the source language 174.

The user's choice of the kind of translation desired depends on his/her particular needs. For instance, users who are totally unfamiliar with the sites in the target language may opt for machine translations with reading aids 172 so as to get an idea about the contents of the site in a broad manner. On the other hand, users whose needs warrant a more clear and unambiguous translation of the sites will prefer well-translated sites. If the user opts for a machine translation of web sites, such machine translation is done by the server 176 and displayed as translated search results to the user who may then select a site and browse it in the source language 174.

Whereas the present invention may be embodied in many forms, details of a preferred embodiment are schematically shown in FIGS. 1 through 3, with the understanding that the present disclosure is not intended to limit the invention to the embodiment illustrated. While the invention has been particularly shown and described with reference to certain embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A method for performing a contextual search and retrieval of documents in a computer network, comprising:

receiving through an input device, a query in a first language;

processing said query to extract at least one content word from the query;

performing dialectal standardization of the at least one content word extracted from the query;

translating the at least one dialectally standardized content word into a second language through a translator;

performing a contextual search in the second language based on the at least one translated content word, using a search engine in the second language; and obtaining the search results in the second language in the form of at least one of site names (URLs) and documents, satisfying a search criteria.

2. A method as recited in claim 1, wherein said inputting of a query in the first language includes entering of a word in the form of a query by the user.

3. A method as recited in claim 1, wherein the user may be prompted for another query if the dialectal controller was unable to extract keyword from the initial query input by the user.

4. A method as recited in claim 1, wherein said first language is English.

5. A method as recited in claim 1, wherein said second language is Chinese.

6. A method as recited in claim 1, wherein the user may selectively choose to translate all or portions of the search results obtained in the second language into the first language.

7. A method as recited in claim 6, further comprising:

inputting said search results obtained in the second language into a translator;

translating the search results into the first language; and displaying said search results in the first language.

8. A method as recited in claim 6, wherein the user may also select the translations to be machine translations with reading aids or well-translated pages.

9. A method for searching and retrieving of documents in a computer network, in a language other than a source language, the method comprising:

receiving through an input device, a query in a source language;

processing the query to extract a content word;

performing dialectal standardization of the content word extracted from the query;

translating the dialectally standardized content word into a target language through a translator;

performing a contextual search in the target language using a search engine, based on the translated content word;

obtaining the search results in the form of site names (URLs), pages and descriptions in the target language satisfying search criteria;

displaying the search results in the target language; and translating of search results from the target language to the source language by a server based on the selection of a user, wherein the server maintains a collection of well translated pages for the purpose of search and retrieval of documents, wherein the user has the option of requesting at least one of a well-translated version and a machine-translated version of said documents.

10. A method as recited in claim 9, wherein said server maintains a collection of well-translated pages and updates said collection of pages with revisions or additional copies.

11. A method as recited in claim 9, wherein said well-translated pages are translations made in accordance with user needs.

12. A system for performing contextual search and retrieval of documents comprising:
- a query input device for inputting a query in a first language;
- a dialectal controller for dialectally standardizing the content word/key word extracted from the query input;
- a first translator for translating the dialectally standardized word into a second language;
- a search engine for searching in the second language, the site names (URLs), pages and descriptions satisfying search criteria;
- a display screen unit for displaying the search results in the second language; and
- at least a second translator for translating the search results into the first language.

13. A system as recited in claim 12, wherein said inputting of a query in the first language includes entering a word in the form of a query by the user.

14. A system as recited in claim 12, wherein the user may be prompted for another query if the dialectal controller was unable to extract keyword from the initial query input by the user.

15. A system as recited in claim 12, wherein said first language is English.

16. A system as recited in claim 12, wherein said second language is Chinese.

17. A system according to claim 12, wherein the user may selectively choose to translate all or portions of the search results obtained in the second language into the first language.

18. A system as recited in claim 17, wherein the user may also specify the translations to be machine translations with reading aids or well translated sites.

19. A system for searching and retrieving of documents in a language other than the source language, the system comprising:
- a query input device for inputting a query in a source language;
- a dialectal controller for dialectally standardizing the content word/key word extracted from the query input;
- a translator for translating the dialectally standardized word into a target language;
- a search engine for contextual searching a network, in the target language for documents satisfying a search criteria;
- a first input unit for inputting the translated word into said search engine for performing a search in the target language;
- a display screen unit for displaying the search results found in the target language;
- means of selecting among the search results found; and
- a server for translation of the selected search results from the target language to the source language based on the selection of a user, said server maintaining a collection of well translated pages for the purpose of search and retrieval of documents, wherein the user has the option of requesting at least one of a well translated version and a machine translated version of said documents.

20. A system as recited in claim 19, wherein said server maintains a collection of well-translated pages and constantly updates said collection of pages with new information, revisions or additional copies.

21. A system as recited in claim 19, wherein said well-translated pages are translations made in accordance with user needs.

22. A method for translating a query input by a user in a first language into a second language and searching and retrieving documents in the second language, comprising:
- processing a query input in a first language to extract content or keyword and dialectally standardizing the extracted content word;
- translating said standardized content word into a second language; and
- performing a contextual search in the second language, based on the content word, obtaining search results in said second language.

23. A method for translating a query input by a user in a first language into a second language and searching and retrieving documents in the second language, and translating said web documents into the first language, comprising:
- processing a query input in a first language to extract content word and dialectally standardizing the content word;
- translating said standardized keyword into a second language;
- contextually searching and obtaining search results in said second language; and
- translating said search results into said first language.

24. The method as recited in claim 1 further comprising: displaying the contextual search results in the second language.

25. The method as recited in claim 1 further comprising:
- translating the contextual search results into the first language, and
- displaying the search results in the first language.

26. The system as recited in claim 12 wherein the dialectal controller uses a database including and excluding certain verbal entries based on statistical data in conjunction with syntactic analysis.

27. The method as recited in claim 1 wherein the first language is English and the second language is Chinese.

28. The method as recited in claim 1 wherein the first language is Chinese and the second language is English.

* * * * *